United States Patent [19]

Llave et al.

[11] Patent Number: 5,101,903
[45] Date of Patent: Apr. 7, 1992

[54] METHOD FOR MODIFYING THE PERMEABILITY OF AN UNDERGROUND FORMATION

[75] Inventors: Feliciano M. Llave; Thomas E. Burchfield; David K. Olsen, all of Bartlesville, Okla.

[73] Assignee: Akzo NV, Arnhem, Netherlands

[21] Appl. No.: 577,407

[22] Filed: Sep. 4, 1990

[51] Int. Cl.$^5$ .................... E21B 33/138; E21B 43/22
[52] U.S. Cl. .................................. 166/294; 166/274; 166/275
[58] Field of Search ............... 166/273, 274, 275, 294, 166/305.1; 252/8.551, 8.554

[56] References Cited

U.S. PATENT DOCUMENTS

| | | | |
|---|---|---|---|
| 3,343,599 | 9/1967 | Eddins, Jr. et al. | 166/294 |
| 3,507,331 | 4/1970 | Jones | 166/273 |
| 3,520,365 | 7/1970 | Jones | 166/273 |
| 3,604,508 | 9/1971 | Son, Jr. | 166/294 |
| 3,866,680 | 2/1975 | Dauben | 166/273 |
| 4,113,631 | 9/1978 | Thompson | 252/8.55 |
| 4,125,158 | 11/1978 | Waite et al. | 166/273 |
| 4,159,037 | 6/1979 | Varnon et al. | 166/294 X |
| 4,194,563 | 3/1980 | Schievelbein | 166/273 |
| 4,296,811 | 10/1981 | Morris et al. | 166/273 |
| 4,434,062 | 2/1984 | Oswald et al. | 252/8.554 |
| 4,456,537 | 6/1984 | Oliver et al. | 252/8.551 |
| 4,485,872 | 12/1984 | Stapp | 166/273 |
| 4,528,102 | 7/1985 | Oliver et al. | 252/8.552 |
| 4,554,082 | 11/1985 | Holtmyer et al. | 252/8.55 |
| 4,592,425 | 6/1986 | Oliver et al. | 166/312 |
| 4,745,976 | 5/1988 | Harwell et al. | 166/273 |

FOREIGN PATENT DOCUMENTS 103779  3/1984  European Pat. Off.

OTHER PUBLICATIONS

French, T R., Gao, H. W., and Bertus, K. M., "Cross-linking Dry Xanthan Gum for Profile Modification in Oil Reservoirs", DOE Report: NIPER-339, May 1988.
Huang, C. G., Green, D. W., and Wilhite, G. P., "An Experimental Study of the In-Situ Gelation of Chromium (III)-Polyacrylamide Polymer in Porous Media", SPE/DOE 12638, Proceedings of the SPE/DOE Fourth Symposium on Enhanced Oil Recovery, Tulsa, Okla., Apr. 15-18, 1984.

Primary Examiner—George A. Suchfield
Attorney, Agent, or Firm—Louis A. Morris

[57] ABSTRACT

A method is disclosed for reducing the permeability of the more permeable zone of an underground formation having nonuniform permeability, the method comprised of injecting into the formation a blend comprised of a surfactant and an alcohol, said blend introduced in an amount effective to reduce the permeability of the more permeable zone of the formation. The preferred surfactant is an amine oxide, most preferably dimethyltallowamine oxide, delivered in water. The preferred alcohol is isopropanol. The disclosed method may optionally comprise the further step of injecting an alcohol slug following injection of the surfactant and alcohol blend.

9 Claims, 12 Drawing Sheets

METHOD FOR MODIFYING THE PERMEABILITY OF AN UNDERGROUND FORMATION

BACKGROUND OF THE INVENTION

This invention relates to a method of reducing the permeability of the more permeable zones of an underground formation and in particular, such formations containing hydrocarbons.

Variations in permeability and reservoir heterogenies can significantly affect the sweep efficiency of oil recovery processes. The efficiency of these processes is dependent upon (1) microscopic displacement efficiency and (2) volumetric sweep efficiency. A small improvement in volumetric sweep efficiency can have a significant impact on the overall efficiency of an oil recovery process.

Several methods for improving reservoir sweep efficiency through permeability modification have been proposed. In recent years there has been a considerable interest in the application of cross-linked polymer technology to alleviate the problems associated with reservoir heterogeneity. Two processes are used commercially to cross-link polyacrylamides and biopolymers. Both processes are based upon the controlled-release of multivalent metal ions which results in polymer cross-linking. But the application of polymer technology for permeability modification has several limitations which have yet to be fully addressed. Problems with polymer (also known as gelled-polymer) treatments include (1) limited depth penetration, (2) loss of injectivity, (3) problems controlling polymer gellation rates, (4) loss of viscosity caused by shear degradation, (5) polymer precipitation and degradation under reservoir conditions, (6) environmental concerns over crosslinking agents, and (7) in some cases, undesirable polymer-surfactant interaction.

U.S. Pat. No. 4,194,563 discloses a method for recovering petroleum from a subterranean formation having at least two different permeabilities. After a water or surfactant flood, an aqueous treating liquid is injected into the formation. The aqueous treating liquid has a viscosity no more than twice that of water, contains at least one surfactant, and is capable of producing a stable viscous oil-in-water emulsion with petroleum present in the zone of the formation being treated. After the injection of treating liquid, the face of the formation exposed to the injection well is flushed with an emulsion-breaking liquid comprising an alcohol in order to break any emulsion which has formed in the low permeability zone at the formation face. Following the flushing step a second surfactant containing oil-displacing fluid is injected into the formation to displace petroleum from the low permeability zones which have not been blocked by the emulsion. Preferably the aqueous treating liquid is comprised of an emulsifying surfactant mixture of an alkylpolyalkoxyalkylene sulfonate or alkylarylpolyalkoxyalkylene sulfonate and a water-soluble organic sulfonate such as an alkyl sulfonate, an alkyl aryl sulfonate or a petroleum sulfonate. Additionally the treating liquid may contain an ethoxylated or an ethoxylated and propoxylated non-ionic surfactant of a specific formula.

U.S. Pat. No. 4,296,811 discloses a method for improving the sweep efficiency of a post-primary oil recovery process in an oil bearing subterranean formation containing a high concentration of divalent ions in the connate water. The method involves injecting a surfactant system comprised of a predominantly sodium chloride brine, a petroleum sulfonate surfactant, a cosurfactant and no more than 1% oil. The surfactant system forms a macro-emulsion in situ to selectively plug the more permeable zones of the subterranean formation. The cosurfactant is selected from a group consisting of amides, amines, esters, aldehydes, and ketones containing 1-20 carbon atoms and alcohols containing 4-7 carbon atoms. The preferred cosurfactant is isobutyl alcohol.

U.S. Pat. No. 4,745,976 discloses a method for partially or completely blocking the high permeability regions of a reservoir. The technique is based upon the ability to induce phase changes in surfactant solutions by changing counterions or by adding small quantities of different surfactants. An aqueous solution of an ionic surfactant may have a viscosity only slightly different from brine but an increase in the salt concentration or addition of a multivalent counterion can cause the surfactant to form a solid precipitate or form a gel-like structure of high viscosity. In the method of U.S. Pat. No. 4,745,976, a first surfactant solution is injected into the formation followed by a water-soluble spacer fluid followed by a second surfactant solution. In situ mixing of the two surfactant solutions is affected by the tendency of different surfactant types to travel at different velocities through the reservoir. The compositions of the first and second surfactants solutions are chosen so that upon mixing a precipitated or gel-like structure will form blocking the high permeability zone of the reservoir.

There are however continuing problems with the known permeability reduction methods. In particular, known methods do not permit further propagation of the permeability reduction slug (e.g., polymer and/or surfactant) after initial setting. Known methods are also prone to injectivity loss. Additionally, methods which require in situ mixing and/or contact of various fluids (such as the mixing of two surfactant solutions or the mixing of a surfactant and a brine) are problematic. For example, the fluids may contact at the wrong location in the reservoir, leading to premature gelling. There is also the likelihood of partial or incomplete contact of the fluids resulting in insufficient plugging or blocking of high permeability zones.

SUMMARY OF THE INVENTION

In one embodiment the current invention is a method of reducing the permeability of the more permeable zone of an underground formation having non-uniform permeability, the method comprised of injecting into the formation a blend comprised of a surfactant and an alcohol, said blend introduced in an amount effective to reduce the permeability of the more permeable zone of the formation. Optionally, the method may further comprise the subsequent step of injecting into the formation an alcohol slug.

In a preferred embodiment, the blend is comprised of an amine oxide as the surfactant and isopropanol as the alcohol.

DETAILED DESCRIPTION OF THE INVENTION

Figure 1:
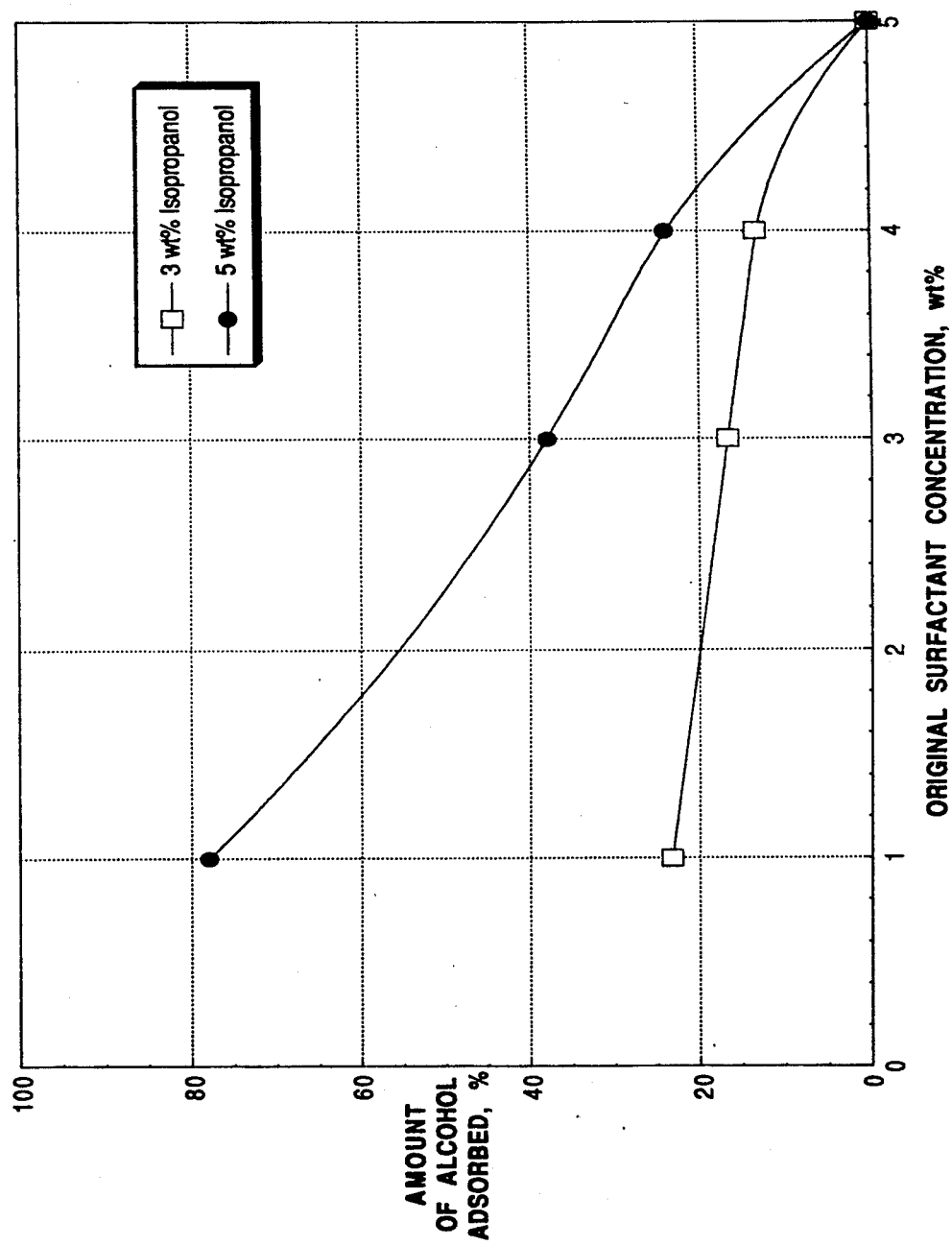
FIG. 1 is a plot of the adsorption of isopropanol on Berea sandstone from a dimethyltallowamine oxide and isopropanol blend.

The current invention is a method of reducing the permeability of the more permeable zone of an underground formation having non-uniform permeability. The method is comprised of injecting into the formation a blend comprised of a surfactant and an alcohol. The blend is introduced in an amount effective to reduce the permeability of the more permeable zone of the formation. As used herein the term "zone" means one or more zones in the formation.

The preferred surfactant for the surfactant and alcohol blends of the current invention are amine oxides. The most preferred amine oxides are dimethyltallowamine oxide (Armostim®PF5 or Armostim®PF8 if delivered in water), dimethyl(hydrogenated tallow)amine oxide (Armostim®PF1 or Armostim®PF7 if delivered in water), dimethylhexadecyclamine oxide (Armostim®PF2), dimethylcocoamine oxide (Armostin® PF3), dihydroxyethylcocoamine oxide (Armostim® PF6), dimethylhexadecylamine oxide (Armostim® PF4) and dimethyl(middle cut)cocoamine oxide (Armostim® PF9, delivered in water). Specially preferred is dimethyltallowamine oxide, delivered in water. The Armostim® amine oxides are available from Akzo Chemicals Inc., Chicago, Ill.

The preferred alcohols are methanol, ethanol, n-propanol, isopropanol, isoamyl alcohol, n-butanol, sec. butanol and tert. butanol. The most preferred alcohol is isopropanol.

The surfactant and alcohol blends of the current invention may have surfactant to alcohol weight ratios of about 1:5 to about 1:1. Typically, such ratios are about 3:5 to about 1:1. Typical injection volumes of surfactant and alcohol blends are about 0.05 to about 0.30 PV of the targeted zone. The ratio of surfactant to alcohol and the amount of surfactant and alcohol blend injected will vary depending on many factors, particularly reservoir and fluid characteristics. The adjustments necessary to practice the current invention under varying reservoir conditions are evident to the skilled artisan.

The method of the current invention provides, among other things, the surprising and unexpected ability to propagate the set permeability barrier (e.g. the surfacant and alcohol blend after alcohol loss). Further, initial injection and subsequent in-depth propagation may be accomplished with improved injectivity loss. Also, when compared to known methods, the method of the current invention uses substances which are easily handled and injected, and allow for easy clean-up.

The current invention and its advantages fully described and disclosed by the following non-limiting experiments and results.

Materials Used in Experiments. All solutions in the following experiments were prepared on a weight/weight basis. Viscosities of the surfactant and alcohol solutions were determined using a Brookfield LVT cone and plate viscometer. Two brine formulations were used for the experiments. One was based on the North Burbank Unit (NBU) brine (from the Burbank field in Osage County, Okla.) with a salinity of 8.6% total dissolved solids (TDS) (66.5 g/l NaCl, 20.27 g/l $CaCl_2.H_2O$, and 5.125 g/l $MgCl_2.6H_2O$) and a synthetic brine with a salinity of 3.5% TDS (27.8 g/l NaCl, 9.45 g/l $MgCl_2.6H_2O$, 7.7 g/l $Na_2SO_4.10H_2O$, and 0.24 g/l $NaHCO_3$). The alcohols used for the study were gas chromatography (GC) and class IB grade batches and were used in the formulations without further purification.

The oil used in the oil displacement study was from the Mink Unit located in the Delaware-Childers field in Nowata County, Okla. The oil was an intermediate 34° API gravity oil, with a viscosity of 7 cP at 77° F. The reservoir brine salinity was fairly close to that of fresh water.

The dry biopolymer used in the parallel coreflood experiments was xanthan gum. In situ gels were formed by controlled-release crosslinking of the biopolymer with chromium (III). This controlled release was achieved by the slow reduction reaction between thiourea and dichromate to produce chromium (III).

Screening Tests

Viscosity Scans. The desired formulation for permeability modification has a low initial viscosity and a relatively high viscosity during injection into the porous media. Viscosity scans were performed with various combinations of different amine oxide surfactants and different alcohols. The amine oxides used in the viscosity scans were selected from those in the list above. The alcohols tested included methanol (MEOH), ethanol (ETOH), n-propanol (NPA), isopropanol (IPA), isoamyl alcohol (IAA), n-butanol (NBA), sec. butanol (SBA) and tert. butanol (TBA).

The results of the viscosity scans indicated that the surfactant and alcohol blends containing ethanol, isopropanol, tert. butanol and isoamyl alcohol yield higher viscosities than blends containing other alcohols. Further, there was no dependence of solution viscosity or property salinity, allowing for broad application range of these blends, e.g. about 3.5% to about 8.5% TDS. Viscosity scan plots also indicted a viscosity maximum for some IFA blends and some TBA blends.

Phase Inversion Temperature. Phase inversion temperature (PIT) measurements are typically taken to determine the conditions which cause a mixture of hydrocarbon, brine and surfactant to invert from an oil-inwater emulsion to a water-in-oil emulsion. However for this study the PIT was used to determine the transition point (phase separation) of surfactant, alcohol and hydrocarbon blends. The PIT measurements were prompted by the phase separation of surfactant and alcohol blends at 50° C. and alcohol concentrations of less than 5 wt. %. To perform PIT measurements, hydrocarbon (n-decane) was added to 5 wt. % surfactant and 3 and 5 wt. % alcohol blends. The alcohols used were methanol, ethanol, n-propanol, isopropanol and tert. butanol. The PIT for such mixtures was found to be in the range of about 90° C. to about 110° C. This PIT range was determined to be suitable for evaluation experiments since such experiments would be conducted below that temperature range.

Stability and Interaction Experiments. Stability tests were performed to determine the effect of aging, pH variations, small concentrations of iron on solution stability, and conditions that would be expected in a typical waterflood of an oilfield. These experiments involved viscosity measurements and visual observations of the formulations as a function of time as well as varying pH and adding small concentrations of $FeCl_3$. These experiments were conducted at room temperature and at 50° C. Two pH levels, 6.5 and 8.5, were tested. These levels represented a range of pH values found in most of reservoir brines. An arbitrary concentration of 200 ppm of $FeCl_3$ was selected as a relatively high loading of $Fe^{+3}$ ions. The surfactant concentration of 5 wt. % and alcohol concentrations of 3 and 4 wt. % were used in the experiments. The unadjusted pH of the majority of solutions was about 7.5. Adjusting the pH of the solutions was achieved by adding a few drops of either 1 N HCl or 1 N NaOH.

The experimental observations and measurements of solution viscosity were performed at specified intervals of 0, 1, 3, and 5 weeks after the solutions were mixed. The results of the experiments indicated that pH adjustment alone did not significantly alter the viscosity of the blend, considering the long-term effect at different temperature conditions. In general, most of the solutions retained their solution viscosity in spite of aging, pH adjustment and $Fe^{+3}$ ions added.

The stability of various formulations in contact with Berea sandstone and siderite (chalybite), an iron-bearing mineral ($FeCO_3$), and chemicals such as sodium sulfite ($Na_2SO_3$) as an oxygen scavenger were also determined. The bottle tests were performed by allowing a blend of surfactant and alcohol to come in contact with a measured amount of crushed rock (about 0.2 gm of rock/gm of blend) for a period of 1 week at 50° C. A solution of 500 ppm $Na_2SO_3$ in synthetic brine was used for these experiments. The viscosity, pH, and surfactant concentration of the solutions were monitored under different conditions to determine the stability and possible occurrence of chemical interaction. The results showed that the stability of the formulations was not significantly affected even when in contact with siderite and the addition of $Na_2SO_3$. The surfactant loss due to adsorption was slightly higher in the siderite compared to that in Berea. No significant change in pH was detected, indicating the absence of any undesirable chemical reactions.

Adsorption Experiments. Adsorption experiments were conducted to evaluate the adsorption rates of surfactant and alcohol blends on crushed Berea sandstone (180–212 μm size range) and a sandstone sample (Gu Dao) of higher clay content. The adsorption bottle tests were performed by allowing surfactant and alcohol blends to come in contact with a measured amount of crushed sandstone (about 0.2 gm rock/gm of blend). The equilibrium concentration of the surfactant and alcohol in the solution were then determined at 3, 5, and 8 days after initial mixing. Measurement of the equilibrium concentration of the surfactant and alcohol in the solution provided information on the rates and degree of adsorption of each component on the sandstone samples tested. This information was essential in determining the extent of component separation to be expected. The alcohol concentration of the solution was determined by means of a gas chromatograph. Response factors experimentally determined for the alcohols tested were used to calculate the amount of alcohol component present in the solution. The bottle tests were conducted at 50° C.

Figure 2:
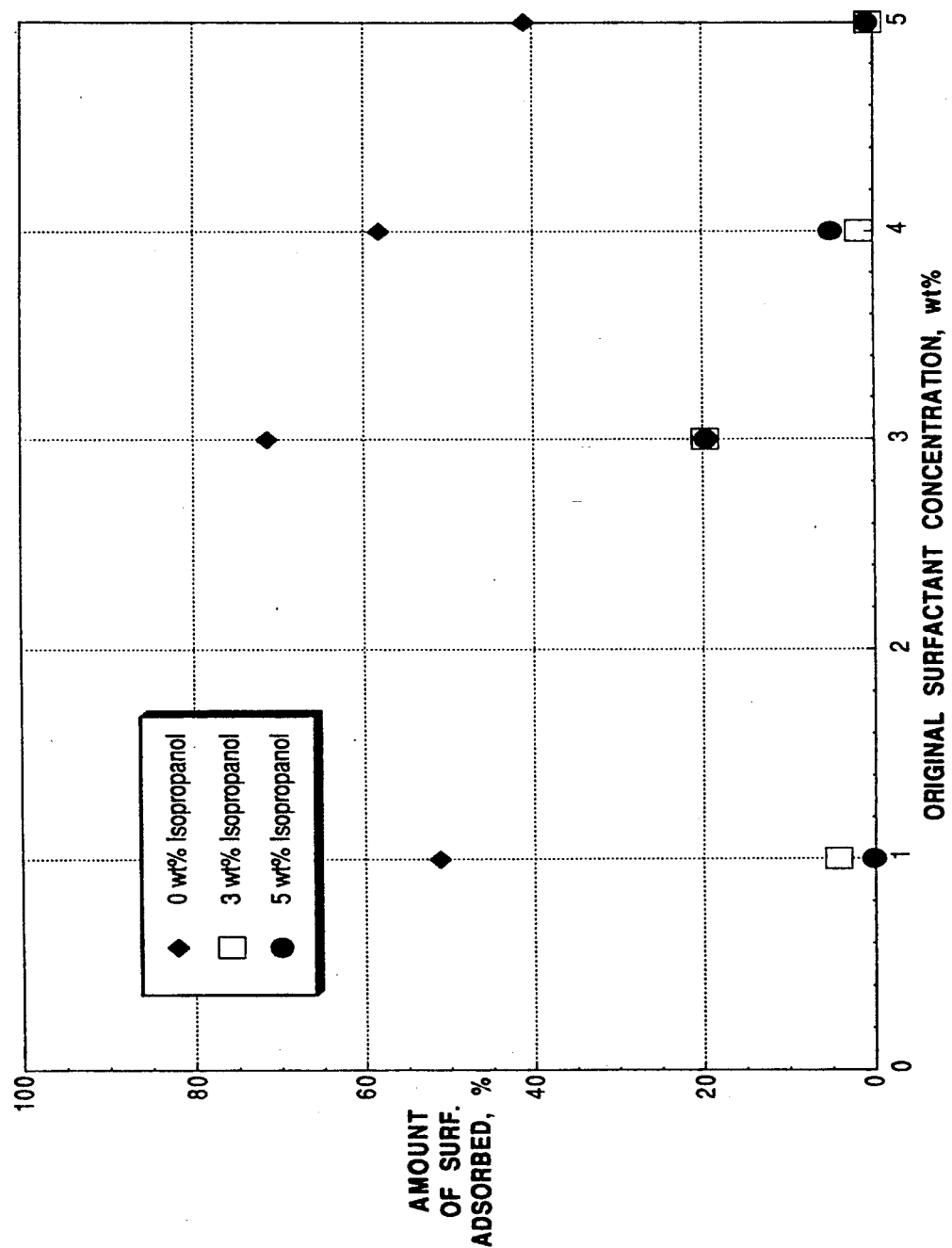
FIG. 2 is a plot of the adsorption of isopropanol on Berea sandstone from dimethyltallowamine oxide and isopropanol blends having various isopropanol concentrations.

The results of some of the adsorption experiments are presented in FIG. 1 and FIG. 2. These results are from the concentration measurements conducted 8 days after initial mixing. These figures show the amounts of alcohol and surfactant adsorbed from the solutions containing dimethyltallowamine oxide (available from Akzo Chemicals Inc., Chicago, Ill. under the tradename Armostim ® PF8) and isopropanol (IPA) in Berea sandstone. The results indicated that higher original alcohol concentration yielded higher alcohol losses when the surfactant concentration in the original solution was less than 3 wt. %. The corresponding loss of surfactant was also considerably higher when the alcohol concentration in the original formulation was less than 4 wt. %.

The adsorption capacities of two sandstone samples were also compared. The adsorption of the surfactant and the alcohol components of the blends were compared using a crushed Berea sandstone and a sandstone from an oil field reservoir (Gu Dao) with a higher clay content. These experiments were conducted using several surfactant solutions containing IPA or TBA alcohols. The results indicated that alcohol adsorption on the two sandstone samples was comparable at the surfactant concentrations tested for solutions containing IPA or TBA. The results also showed that considerably higher surfactant adsorption occurred on the Gu Dao sample compared to the Berea sandstone when no alcohol was present in the original formulation. In the presence of alcohol, surfactant adsorption on the two sandstone samples were comparable.

Overall, the results showed that the presence of alcohol minimized the surfactant loss due to adsorption, which was particularly true for the blends containing isopropanol. Lower surfactant concentrations in the formulation resulted in an increase in alcohol loss due to adsorption.

Displacement Experiments

Slim tube and coreflooding experiments were conducted to determine injection strategies where formulations of various amine oxide surfactants and various alcohols can be applied as a permeability modification agent. Parallel coreflooding oil displacement experiments were also conducted to determine the potential of these surfactant and alcohol blends to impart fluid diversion and oil recovery enhancement and compare the effectiveness the surfactant and alcohol blend treatment with that of a typical gelled polymer formulation.

Slim Tube Experiments. Slim tube experiments were conducted to evaluate different injection strategies that can be used in the application of surfactant and alcohol blends as permeability modification agents. These slim tube experiments were conducted under oil-free conditions. The slim tube was packed with crushed and sieved Berea sandstone (250–425 μm size range), yielding a permeability of about 31.79 darcies and a porosity of 61.8%. The slim tube assembly was 41 ft. (1249.68 cm) long with an inside diameter of 0.18 in. (0.457 cm.). The assembly was designed with five pressure taps located at the inlet and 10, 20, 30, and 40 ft. from the inlet port. These taps provided a means to measure differential pressures across 10-ft. sections of the assembly. The pressure gradient across sections of the core was measured using pressure transducers. A computer-controlled, data acquisition system was used to monitor output voltages of the pressure transducers. This set-up allowed for monitoring the trend or progressive changes in the pressure across sections of the slim tube. All flow experiments were conducted with no back pressure applied. The effluents from the slim tube were collected in test tubes to measure fluid production and determine surfactant and alcohol effluent concentrations at specified time intervals.

For each slim tube experiment, the injection cycle included a presaturation step using brine followed by the injection of a slug of a selected surfactant and alcohol blend. The slim tube was cleaned between runs by flushing with several pore volumes of a mixture of 50 wt. % alcohol and 50 wt. % water. The injection rates selected were established at 20 and 40 ft./D, based on a total core pore volume of 126.80 cm$^3$. This allowed for completion of flow experiments within reasonable time constraints. All these experiments were performed at 50° C. A slug of fluorescein as a tracer was also injected into the assembly prior to the flow experiments to determine the degree of dispersion using the experimental system. The typical recovery of tracer in the effluent was between 85 and 90%.

Figure 3:
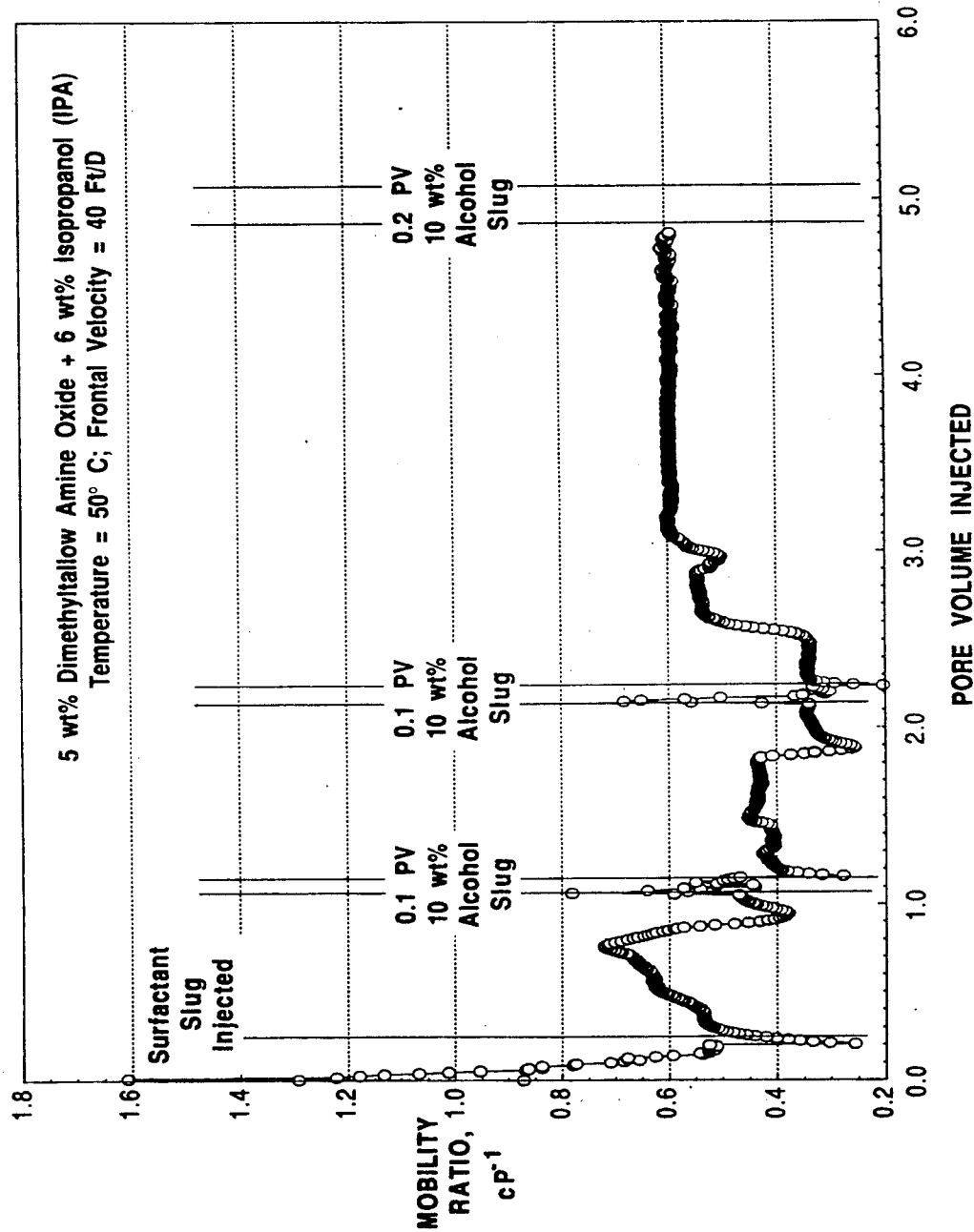
FIG. 3 is a plot of relative mobility reduction vs. pore volume injected for slim tube experiments.

The slim tube experiments were designed to determine whether the depth of initial penetration of the surfactant and alcohol blend can be controlled depending on the proportion of the components in the blend. An example slim tube experiment involved the injection of 0.2 PV of a blend of 5 wt. % dimethyltallowamine oxide as surfactant and 6 wt. % IPA followed by a brine (waterflood) cycle and several slugs of alcohol and brine mixtures. A plot of pressure trace vs. pore volume injected contained a progressive peak in pressure that developed in the inlet up to the 40-ft. section of the slim tube assembly. This indicated that the bulk of the surfactant slug propagated beyond the 30-ft. section, but not through the end of the slim tube. Subsequent injection of brine did not propagate the slug farther but resulted in overall higher levels of pressure in each of the sections (greater than 5 psi). A 0.1 PV of 10 wt. % IPA in brine was injected at about 1.1 PV. A pressure plot indicates that the slug of alcohol may have helped move the bulk of the surfactant and alcohol slug beyond the 40-ft. section mark. A second alcohol slug of 0.1 PV of 10 wt. % IPA in brine was injected at about 2.1 PV injected. The pressure trace showed a considerable rise in detected pressure (greater than 15 psi) in each of the pressure taps but leveled off to about 7.5 psi in each of the sections. The trend indicated that the pressure peaked in the first 10-ft.-section tap, followed by the 20-, 30-, and 40-ft.-section taps. A plot of differential pressure vs. pore volume injected showed that a pressure peak propagated beyond the 30-ft. section of the assembly, prior to additional alcohol slug injections. That plot also indicated that the first 0.1-PV alcohol slug of 10 wt. % IPA propagated the surfactant slug beyond the end of the slim tube and that the second and third alcohol slugs of 10 wt. % IPA did not contribute to any substantial surfactant recovery from the slim tube assembly. FIG. 3 shows the relative mobility achieved during the experiment. The relative mobility (cP$^{-1}$) was used as the measure of the degree of reduction in permeability. This approach allowed for the analysis of the effectiveness of the slug formulation in permeability modification without the benefit of in situ measurement of the viscosity. The relative mobility was calculated from the mobility, $(Q/A)/(\Delta P/L)$, normalized to the brine permeability, which in this case was about 31.79 darcies. The results showed that a significant reduction in mobility was sustained after the first two alcohol slugs were injected. The injection of the alcohol slugs resulted in the propagation of the surfactant through the assembly and imparted a sustained lower relative mobility. The maximum differential pressure that was measured during the experiment was about 9 psi, a 0.9 psi/ft gradient.

Figure 4:
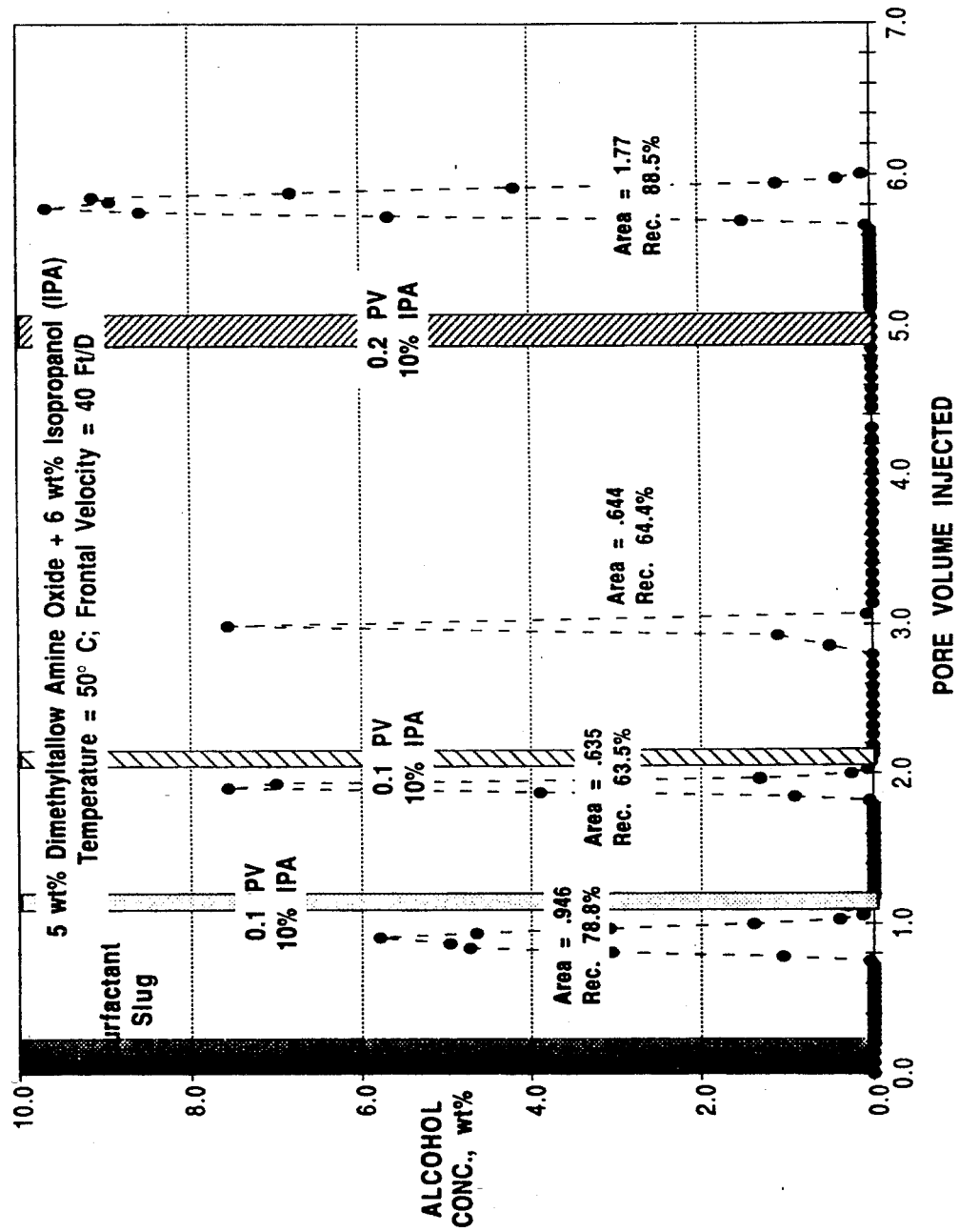
FIG. 4 is a plot of effluent alcohol concentration vs. pore volume injected for slim tube experiments.
Figure 5:
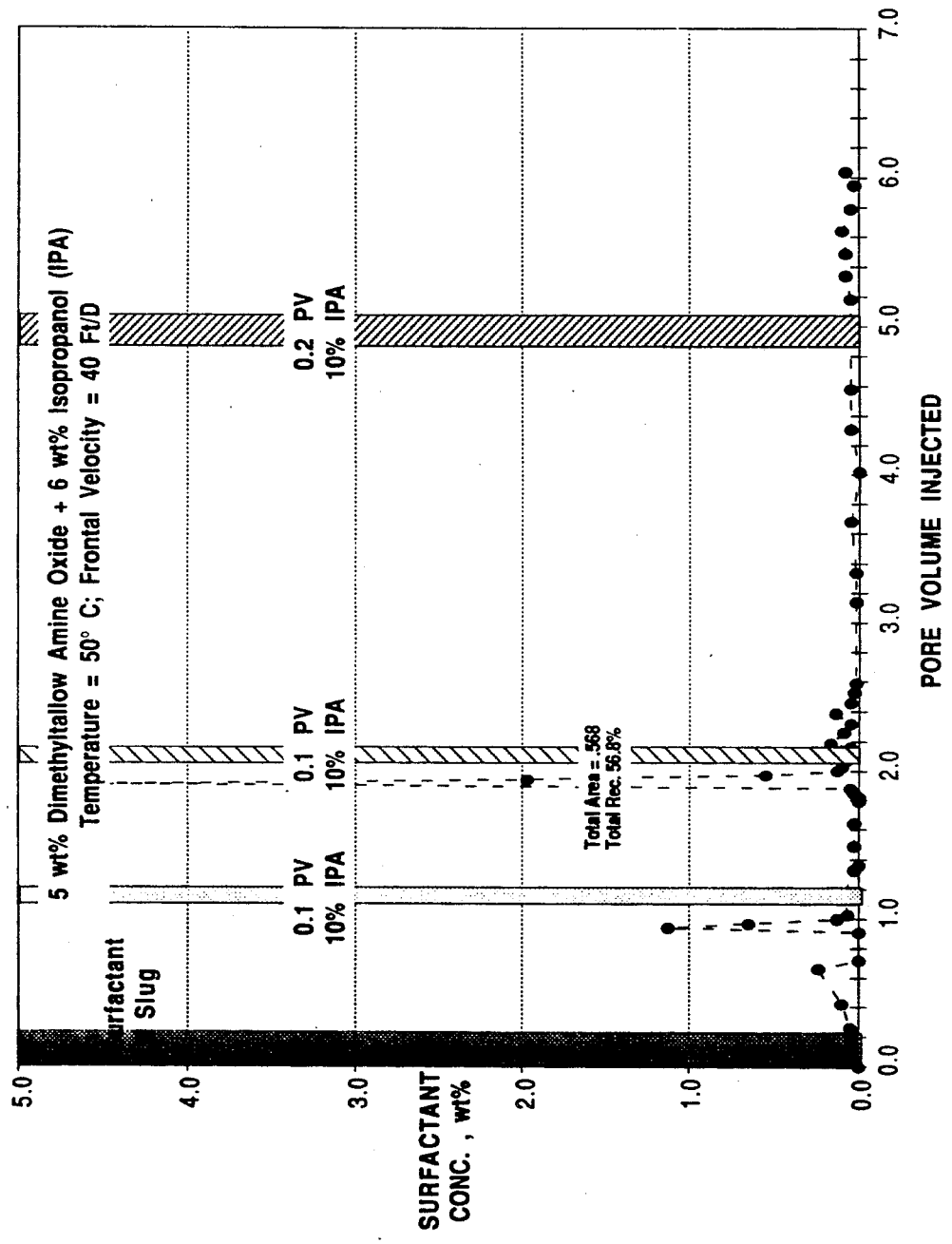
FIG. 5 is a plot of effluent surfactant concentration vs. pore volume injected for slim tube experiments.

The effluent surfactant and alcohol concentration profiles as a function of the pore volume injection areas shown in FIG. 4 and FIG. 5. The alcohol recovered in the effluent was about 70%. This indicated that the alcohol propagated through the slim tube considerably intact. The alcohol front was also detected at about 0.80 PV after each slug injection. The total surfactant recovered was only about 60% of the original surfactant concentration in the surfactant and alcohol slug after the first alcohol slug injection. The results indicated that some of the surfactant remained intact with the original formulation. Some of the surfactant injected was also retained in the slim tube assembly, even after the injection of several alcohol slugs.

Surprisingly, the results of the slim tube study shows that: (1) the injection of the surfactant and alcohol blends alone imparted a significant degree of permeability reduction; (2) the injection of additional alcohol slug(s) behind the slug of the surfactant and alcohol blend provides in-depth propagation of the permeability barrier (surfactant and alcohol blend after loss of alcohol), (3) the presence of a sustained reduction in relative mobility was a direct function of the depth of penetration and propagation of the surfactant slug; and (4) the degree of initial slug penetration was controlled, depending on the component concentrations in the formulation. A summary of the results of the slim tube experiments is presented in Table 1.

TABLE 1

| | | Slim Tube Experiments | | | | | |
|---|---|---|---|---|---|---|---|
| Exp. No. | Chemical System Injected | Initial Depth of Penetration$^a$ (ft.) | Extent of Propagation (ft.) | Total Surfactant Recovered (%) | Avg. Alcohol Recovered (%) | Highest Developed $\Delta P$ (psid) | Reduction in Mobility$^c$ (cP$^{-1}$) |
| 1 | 5% Dimethyltallow amine oxide and 4% IPA | <10 | <10 | 11.9 | 89.8 | 5.0 | 1 |

TABLE 1-continued

| | | Slim Tube Experiments | | | | |
|---|---|---|---|---|---|---|
| Exp. No. | Chemical System Injected | Initial Depth of Penetration[a] (ft.) | Extent of Propagation (ft.) | Total Surfactant Recovered (%) | Avg. Alcohol Recovered (%) | Highest Developed ΔP (psid) | Reduction in Mobility[c] (cP$^{-1}$) |
| 2 | 5% Dimethyltallow amine oxide and 4% IPA | <10 | >40[b] | 68.9 | 71.9 | 16.0 | >0.8[d] |
| 3 | 5% Dimethyltallow amine oxide and 6% IPA | 30–40 | >40[b] | 56.8 | 73.8 | 9.0 | 0.6 |
| 4 | 5% Dimethyltallow amine oxide and 5% IPA | 10–20 | >40[b] | 49.3 | 59.6 | 9.0 | 0.8 |

[a]Injection of surfactant and alcohol slug alone
[b]After injection of additional alcohol slug(s)
[c]Sustained reduction in mobility, cP$^{-1}$
[d]Average value

Coreflood Experiments

Permeability Modification in Short Berea Cores. Coreflooding experiments were performed to determine the degree of permeability reduction in 10-inch long fired Berea sandstone cores when a slug of a selected blend of surfactant and alcohol was injected followed by brine flooding. These coreflood experiments were also conducted under oil-free conditions. The core used for the experiment was a Berea sandstone of about 250 md permeability and porosity of 23%. The core was 25.4 cm long with a diameter of 3.81 cm. The same core was used for all experiments undertaken in this work. The core was cleaned between experiments by flushing with several pore volumes of a 50:50 mixture of isopropanol and water. The coreholder was designed with three pressure taps located in the inlet (7.7 cm from the inlet end of the core), middle (6.0 cm from the inlet tap), and outlet (6.8 cm from the middle tap) sections. These taps provide a means to measure differential pressures across sections of the core. The core was encapsulated in lead inside the coreholder to contain the injected fluid under pressure. The pressure gradient across sections of the core was measured using two differential pressure transmitters, with a maximum differential pressure of 2.17 psi. A dual pen chart recorder was used to monitor the output voltages of the two differential pressure transducers. All flow experiments were conducted with no backpressure applied. The core was vertically mounted in a top-to-bottom injection mode. The effluents from the core were collected in burrettes to measure fluid production and determine surfactant traces at specified time intervals. For each coreflooding experiment, the injection cycle included a core presaturation using brine followed by the injection of a slug of a selected surfactant and alcohol blend. The injection rate selected was established at about 1 ft/D, based on a total core pore volume of 66.5 cm$^3$, an approximate fluid injection rate of 0.055 cm$^3$/min (79.2 cm$^3$/D). All coreflooding experiments were performed at 50° C.

Figure 6:
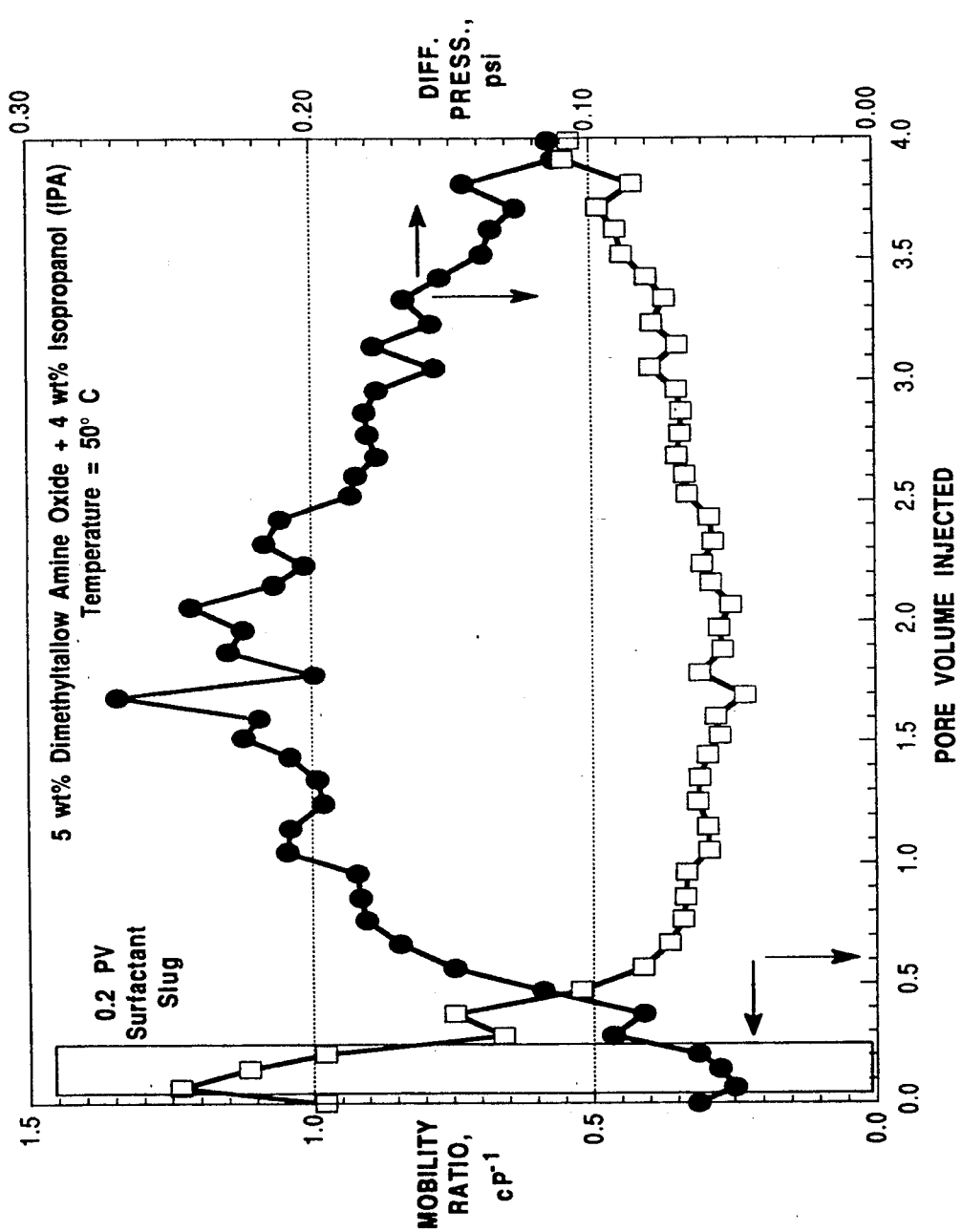
FIG. 6 is a plot of mobility reduction and total differential pressure vs. total pore volume injected for coreflood experiments.

An example coreflood experiment involved the injection of 0.2 PV of a blend of 5 wt. % dimethyltallowamine oxide (Armostim ® PF8) as surfactant followed by a waterflood. FIG. 6 shows the presence of a sustained differential pressure that developed across the core. One important observation made during the experiment was that higher differential pressures developed in the second section of the core. The sustained differential pressure across the core averaged around 0.20 psi. As in the case of the slim tube experiments, the reduction in mobility (cP$^{-1}$) was used as the measure of the degree of reduction in permeability. FIG. 6 also shows a plot of the mobility reduction and differential pressures across the core as a function of pore volume of fluid injected. The effective mobility reduction in example experiment averaged about 0.30 cP$^{-1}$. The reduction in permeability was permanent once the slug was in place. The results of these coreflood experiments are presented in Table 2.

TABLE 2

| | | Short Coreflood Experiments | | | |
|---|---|---|---|---|---|
| Exp. No. | Chemical System Injected | Initial Depth of Penetration[a] (section) | Total Surfactant Recovered (%) | Highest Developed ΔP (psid) | Reduction in Mobility[b] (cP$^{-1}$) |
| 1 | 5% Dimethyl-tallowamine oxide and 5% IPA | beyond 2nd section | 90.3 | 0.21 | 0.90 |
| 2 | 5% Dimethyl-tallowamine oxide and 4% IPA | 2nd section | 48.5 | 0.28 | 0.30 |
| 3 | 5% Dimethyl-tallowamine oxide and 4% TBA | 2nd section | 60.1 | 0.24 | 0.30 |
| 4 | 3% Dimethyl-hexadecyclamine oxide and 5% IPA | beyond 2nd section | 75.9 | 0.11 | 0.90 |

[a]Injection of surfactant and alcohol slug alone
[b]Sustained reduction in mobility, cP$^{-1}$ Parallel Coreflood Oil Displacement Experiments. Coreflood oil displacement experiments were conducted to evaluate the effectiveness of the application of surfactant and alcohol blends as permeability modification agents in improving oil recovery potential of waterflooding processes. These parallel coreflood experiments were conducted under waterflooded residual oil conditions. Berea sandstone cores of different permeabilities were used. The permeability contrast using these cores provided a means by which to evaluate the effectiveness of the treatment to impart fluid diversion. The core assembly utilized 4-ft. long high permeability cores to provide enough length for the surfactant and alcohol components of the injected slug to separate. The two cores used in this apparatus were both 2-in. diameter, 4-ft. long round cores. The assembly was designed with pressure taps located in the inlet as well as at several locations along the cores. These taps provided a means to measure differential pressures across sections of the different cores. In all the coreflood studies conducted, the pressure gradients across the cores were measured using pressure transducers. A computer-controlled data acquisition system was used to monitor output voltages of the pressure transducers. All flow experiments were conducted with no backpressure applied. The effluents from the cores were collected in test tubes to measure fluid production and determine concentration of surfactant and alcohol in the effluent.

For each coreflood experiment, except the gelled-polymer treatment, the injection cycle included presaturation of the core using brine, displacement of the brine with oil to initial oil saturation conditions, the displacement of the oil with brine to residual oil conditions, injection of a slug of a selected surfactant and alcohol blend and the injection of brine behind the chemical slug. The apparatus was cleaned between runs by flushing with several pore volumes of a mixture of 50 wt. % alcohol and 50 wt. % water. The injection rate selected was established at about 2 ft./D, based on the total system pore volume and was kept constant. This allowed for completion of flow experiments within reasonable time constraints. All these experiments were performed at 50° C. The results of these parallel coreflood oil displacement experiments are presented in Table 3.

TABLE 3

Parallel Coreflood Experiments

| | Pore Volume, cm$^3$ | OOIP[1], cm$^3$ | $S_{oi}$[2], % | $S_{ow}$[3], % | $S_{ocf}$[4], % | Rec. Eff[5], % |
|---|---|---|---|---|---|---|
| Coreflood No. 1 (5% Dimethyltallowamine oxide and 5% IPA) | | | | | | |
| LOW PERM | 49.58 | 34.40 | 69.38 | 29.19 | 5.47 | 81.26 |
| MIDDLE PERM | 647.37 | 468.00 | 72.29 | 33.96 | 29.47 | 13.22 |
| HIGH PERM | 555.45 | 360.90 | 64.97 | 31.66 | 25.96 | 18.00 |
| TOTAL | 1252.40 | 863.30 | 68.93 | 32.75 | 26.96 | 17.67 |
| Coreflood No. 2 (5% Dimethyltallowamine oxide and 4% IPA) | | | | | | |
| LOW PERM | 420.50 | 259.20 | 61.64 | 32.09 | 28.42 | 11.44 |
| HIGH PERM | 555.45 | 335.41 | 60.39 | 19.24 | 12.20 | 36.59 |
| TOTAL | 975.95 | 594.61 | 60.93 | 24.78 | 19.19 | 22.55 |
| Coreflood No. 3 (Gelled Polymer) | | | | | | |
| LOW PERM | 420.50 | 251.32 | 59.77 | 25.50 | 21.62 | 15.21 |
| HIGH PERM | 555.45 | 321.01 | 57.79 | 26.58 | 24.31 | 8.57 |
| TOTAL | 975.95 | 572.33 | 58.64 | 26.12 | 23.15 | 11.36 |

[1]Original oil in place
[2]Initial oil saturation
[3]Oil saturation after waterflood
[4]Oil saturation after chemical flood
[5]Rec. Efficiency = $\frac{(S_{ow} - S_{ocf})}{S_{ow}} \times 100\%$ Parallel Coreflood Using Surfactant and Alcohol Blends. An example coreflood experiment using the surfactant and alcohol blends involved the displacement of the oil saturated cores with brine to residual oil saturation, followed by the injection of a blend of 5 wt. % dimethyltallowmine oxide (Armostim ® PF8) as surfactant and 4 wt. % IPA. The chemical slug was followed by a brine (waterflood) cycle. In this experiment, a smaller slug, 0.1 PV slug of the surfactant and alcohol blend was injected for permeability modification treatment. The 0.1 PV slug, based on total system pore volume, represented about 17.5% of the pore volume for the high permeability core. This injected volume was closer to the desired treatment of 0.2 PV. This slug size was in agreement with the slug size that was found in previous slim tube and short coreflood studies to be sufficient to generate reasonable reduction in permeability.

Plots of injection pressure trace vs. total pore volume injected and differential pressure vs. total pore volume injected indicate agreement with previous studies in which the permeability barrier was observed to occur in the second section of the high permeability core using the same surfactant and alcohol formulation. The bulk of the permeability alteration in the high permeability core occurred at about 2 to 3 feet from the injection point (50–75% of total length). The qualitative correlation between slug size and component concentration levels on initial depth of penetration agreed very well with the present experimental observations.

One area of concern during the experiment was the level of increase in injection pressure during the study. The injection pressure increased from around 8 psig to about 18 psig (averaged) after treatment. In a conventional permeability modification treatment, the flow rate would have been cut down to half to maintain the original injection pressure, or to avoid excessive pressure buildup. During the experiment though, the injection rate was kept constant.

Figure 7:
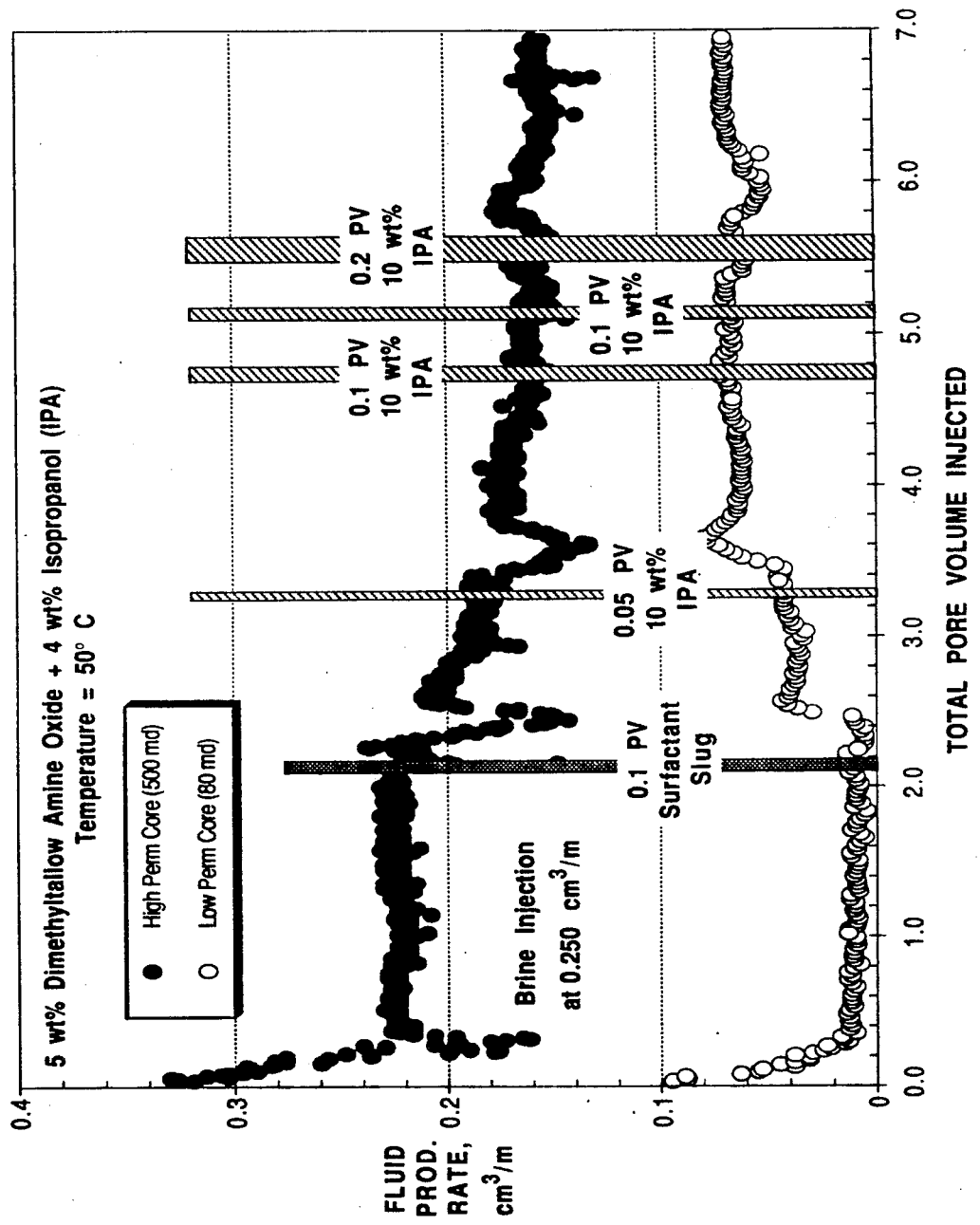
FIG. 7 is a plot of fluid production vs. total pore volume injected for parallel coreflood experiments.

The fluid production rate traces shown in FIG. 7 indicated that a substantial amount of the injection fluid was diverted from the high permeability core to the low permeability core. The fluid production rate from the high permeability core changed from an average of about 0.24 cm$^3$/min to 0.15 cm$^3$/min (38% reduction) after surfactant and alcohol treatment. The fluid production rate from the low permeability core changed from about 0.01 cm$^3$/min to 0.07 cm$^3$/min (600% increase). The amount of fluid diversion after treatment was significant, considering that the core effluent rate ratio $Q_{highperm}/Q_{lowperm}$, was reduced 24 to 2. More favorable fluid flow ratios were established after the surfactant and alcohol treatment. About 96% of the total injected fluid was flowing through the high permeability core before the surfactant and alcohol treatment. This was reduced to 67% after the treatment, which is about a 30% reduction.

Figure 8:
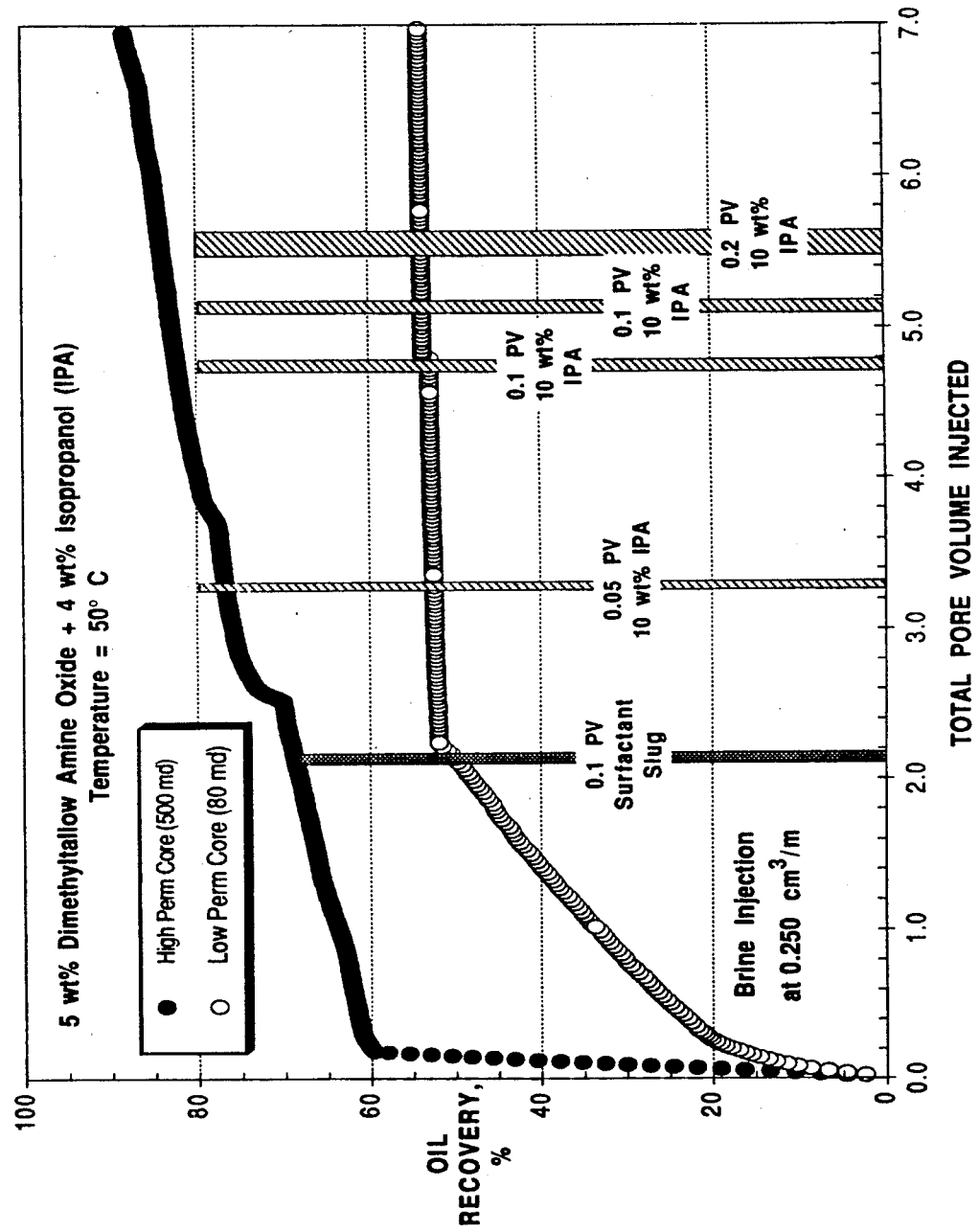
FIG. 8 is a plot of oil recovery vs. total pore volume injected for parallel coreflood experiments.
Figure 9:
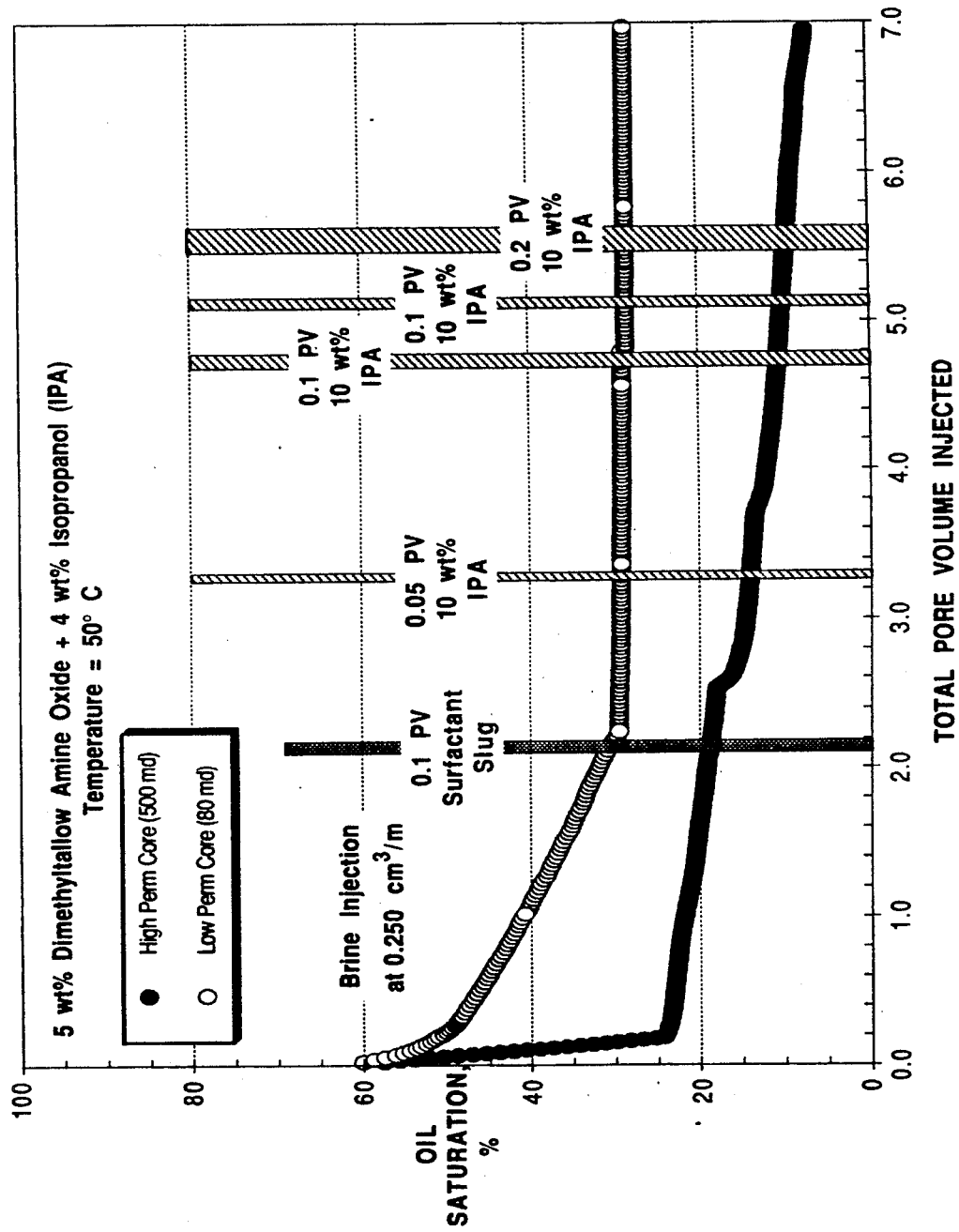
FIG. 9 is a plot of oil saturation vs. total pore volume injected for parallel coreflood experiments.

Permeability modification in the high permeability core resulted in (1) diversion of more fluid into the low permeability core and (2) improvement, to some degree, of the sweep efficiency in the high permeability core. These were reflected in the relative improvement in oil recovery from both cores. The total oil recovered from the two cores after waterflood, prior to the surfactant and alcohol slug injection, was only about 50% and 70% for the low and high permeability core respectively, as is shown in FIG. 8. The oil recovery curve for the both high and low permeability cores showed a slight increase after the injection of the surfactant and alcohol slug, yielding final oil recovery values of 56% and 90%, after 7.0 pore volumes of fluid injected. The oil saturation data for the two cores are presented in FIG. 9. The high permeability core had an oil saturation of about 10%, at the end of the test, while the low permeability core had 28% oil saturation. The improvement in oil recovery from the high permeability core was significant. Favorable interfacial tensions due to the presence of a surfactant may have contributed to some of the improvement in oil recovery from this core.

Parallel Coreflood Using Gelled-Polymer (Comparative). Gelled polymers have been used in some field applications for permeability modification in cases where fluid flow control was necessary. For this comparative example, the crosslinking system of xanthan gum biopolymer, sodium dichromate and thiourea were used. The experimental procedures used in the preparation and injection strategies used in this are based on those presented in the following publications: (1) "Crosslinking Dry Xanthan Gum for Profile Modification in Oil Reservoirs", French, T. R., Gao, H. W., and Bertus, K. M., DOE Report: NIPER-339 (May, 1988), and (2) "An Experimental Study of the In-Situ Gelation of Chromium (III)-Polyacrylamide Polymer in Porous Media", Huang, C. G., Green, D. W. and Wilhite, G. P., SPE/DOE 12638, Proceedings of of the SPE/DOE Fourth Symposium on Enhanced Oil Recovery, Tulsa, Okla., Apr. 15-18, 1984.

For the gelled-polymer application, initial pH conditions and temperature are experimental variables that significantly affect gelation behavior. Mid-range pH conditions (pH of 3 to 6), have been shown to form stable gels within about 5 to 20 days at ambient conditions. Higher temperature conditions increased the reaction rate of the process but also contributed to gel syneresis. The present experimental conditions, in terms of pH, required adjustment from a pH of 8.5 down to about 5, in order for faster gelation to occur. This required an extra experimental step of pre-flushing the coreflooding system with a low pH adjusted brine.

An example coreflood experiment involved the displacement of the oil saturated cores with brine to residual oil saturation, followed by a gelled-polymer treatment. Isolating the low permeability core from fluid flow, the high permeability core was injected with a blend of a gelled-polymer crosslinking system containing 2,000 ppm biopolymer, 100 ppm dichromate, and 100 ppm thiourea. A 5-day shut-in gelation period was provided followed by a brine (waterflood) cycle. The pH of the injected fluids was adjusted to 5.0. This was necessary to lower the initial pH level of 8.5 down in the near-injection region to levels where the crosslinking systems developed stable gels within a reasonable time. The polymer system slug size injected was about 0.3 PV based on total system pore volume.

A plot of injection pressure trace vs. total pore volume injected indicated significantly higher injection pressures after the polymer slug treatment, compared to the above-presented experiments using the surfactant and alcohol blends. The area of concern during this experiment was the level of increase in injection pressure during the polymer injection and after treatment. The injection pressure increased from around 11 psig to about 200 psig during polymer injection, at the same total injection rate used in the recovery experiment employing surfactant and alcohol blend treatments. The established injection pressure was over 75 psig after polymer treatment, at the same injection rate of 0.25 cm$^3$/min. It was necessary to reduce the brine flow rate after the polymer treatment in order to maintain comparable injection pressures from the previous experiment using surfactant and alcohol blends.

Figure 10:
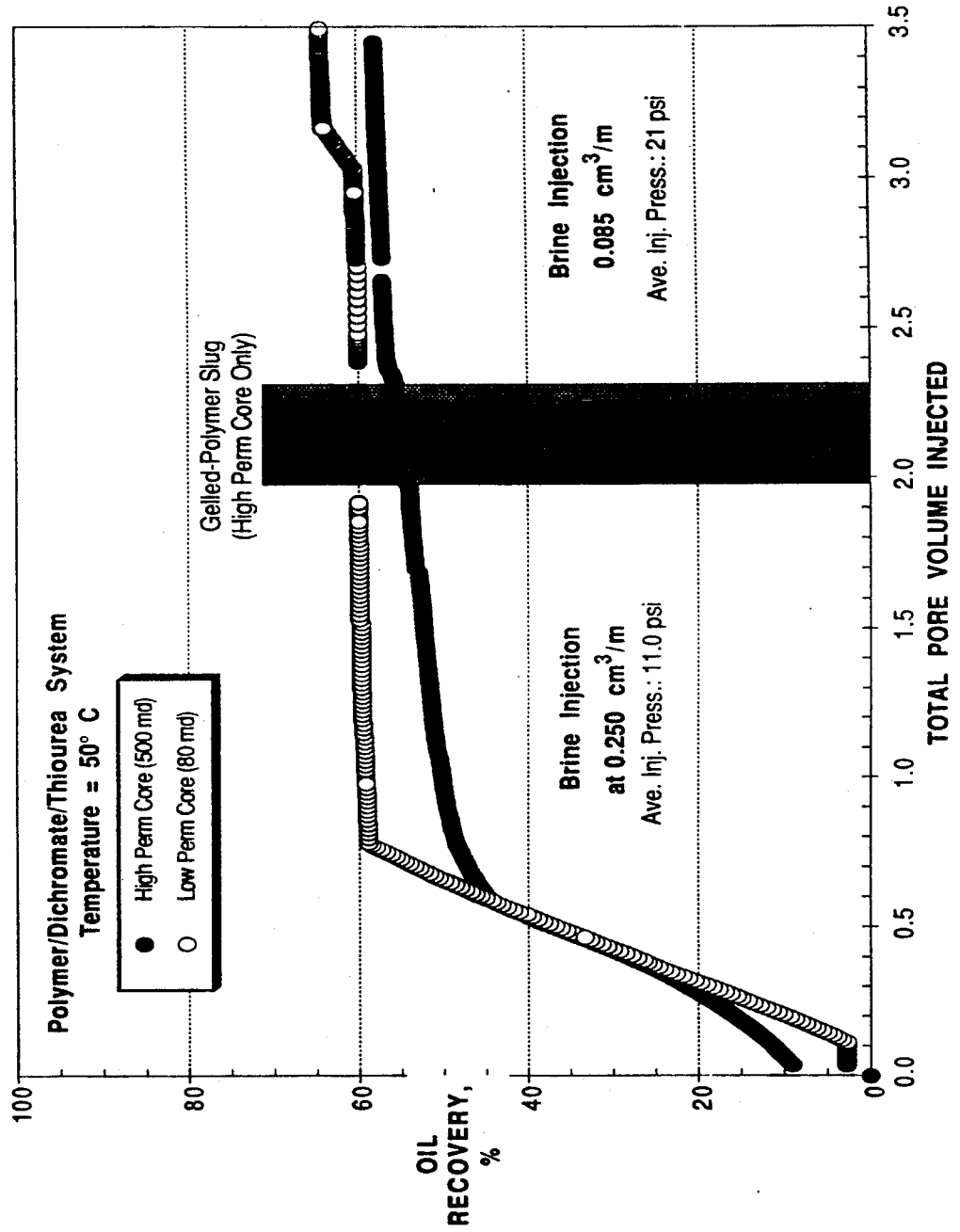
FIG. 10 is a plot of oil recovery vs. total pore volume injected for parallel coreflood experiments.
Figure 11:
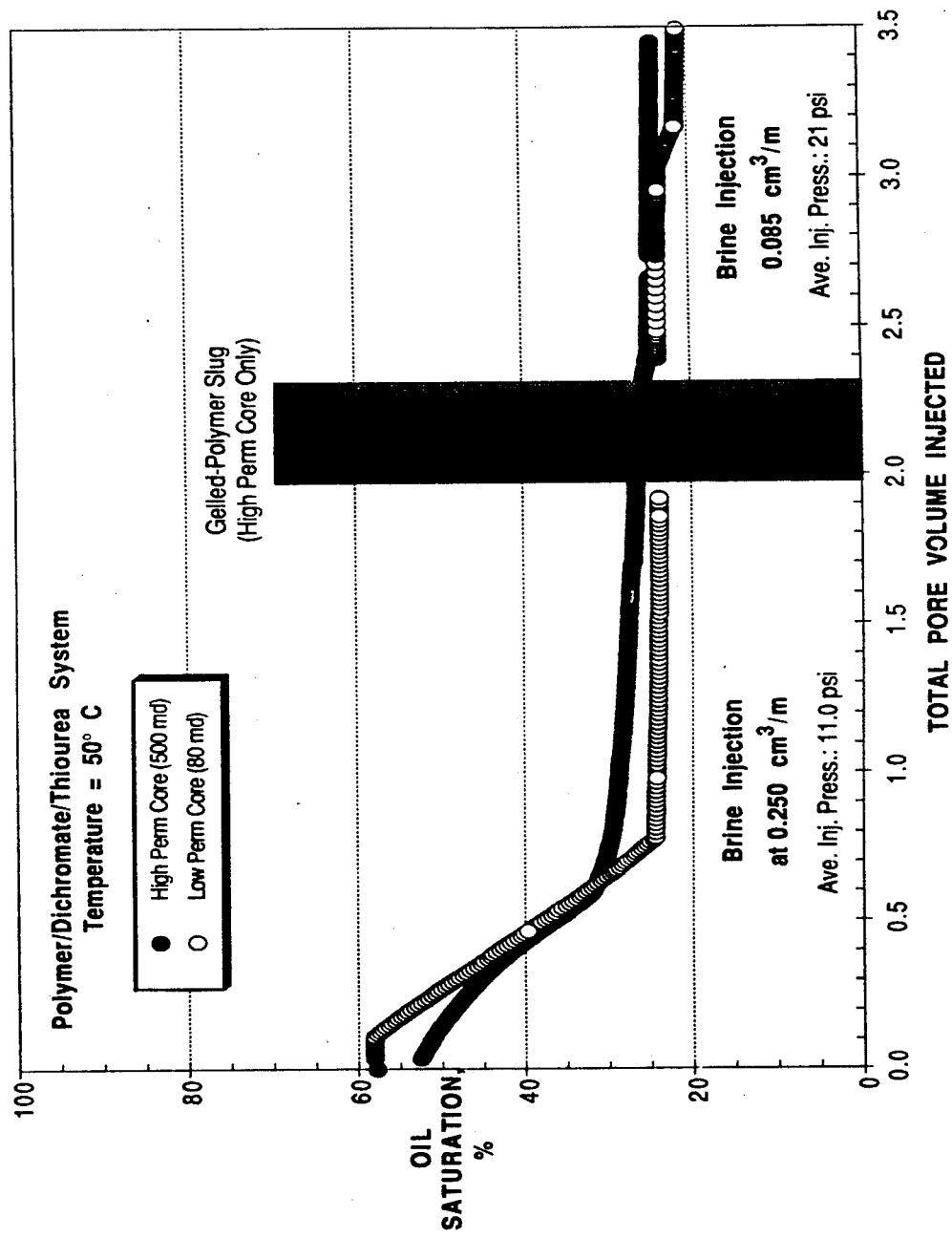
FIG. 11 is a plot of oil saturation vs. total pore volume injected for parallel coreflood experiments.

From the standpoint of fluid diversion, the gelled-polymer treatment resulted in a substantial diversion of the injected fluid from the high permeability zone to the low permeability zone. The gelled-polymer permeability barrier in the high permeability core resulted in (1) the almost complete diversion of injected fluid into the low permeability core and (2) improvement to a limited degree, of the sweep efficiency in the high permeability core during the polymer injection. These are reflected in the relative improvement in oil recovery from both cores, before and after gelled-polymer treatment. The oil recovery levels for the two cores, before polymer slug injection, were only about 54% and 59% (low and high permeability cores respectively), as shown in FIG. 10. The oil recovery curve for the low permeability core showed no significant increase after the injection of the polymer slug, yielding a final oil recovery value of 61%, after 3.0 pore volumes of fluid injected. The oil recovery from the high permeability zone after polymer treatment was only 57%. The oil saturation trace for the two cores are presented in FIG. 11. The high permeability core had an oil saturation of about 25%, at the end of the test, while the low permeability core had 24%.

Figure 12:
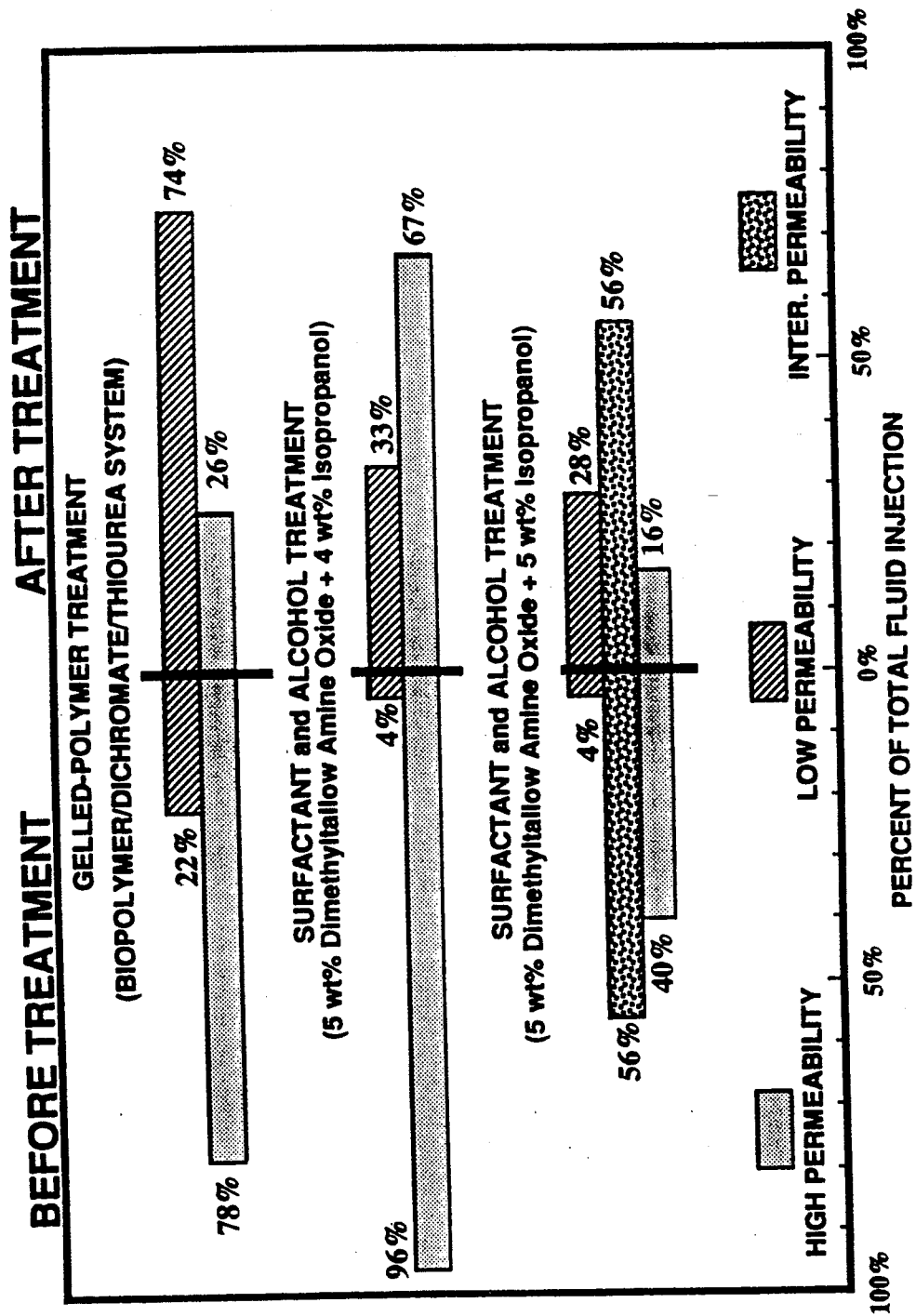
FIG. 12 is a graph comparing fluid diversion affected by a gelled-polymer treatment (comparison) to the fluid diversion affected by surfactant and alcohol blend treatments of the current invention.

Comparison of Surfactant and Alcohol Blend Systems to Gelled Polymer Systems for Permeability Modification Both the surfactant and alcohol blend system and the gelled polymer system showed comparable ability to achieve fluid diversion from the high permeability core to the lower permeability core. FIG. 12 shows a comparison of the two permeability modification methods in terms of fluid diversion.

However, surprisingly, the use of surfactant and alcohol blends did not result in insurmountable injectivity problems, while the initial injection rate in the gelled-polymer had to be reduced to avoid excessive injection pressure. Throughout the surfactant and alcohol injection, the injection pressures remained relatively normal (10 psi at 0.25 cm$^3$/min) until the initial depth of penetration of the slug was achieved and a permeability barrier was established in the high permeability core. During the injection of the gelled-polymer system, the injection pressures increased as high as 200 psi at 0.10 cm$^3$/min. In terms of the time needed to inject the treatment slugs, the surfactant and alcohol slug of 0.1 PV was injected within 6.5 hrs at the rate of 0.25 cm$^3$/min. For the gelled-polymer system, a total of 0 30 PV, was injected (with in-line mixing) in 32 hrs. at the rate of 0.10 cm$^3$/min. The initial injection rate of 0.250 cm$^3$/min was reduced to 0.10 cm$^3$/min to avoid excessive injection pressures of over 200 psi.

The brine injection rate after the surfactant treatment was maintained at 0.25 cm$^3$/min. In both cases, the injection pressures were about 20 psi. The brine injection rate after the surfactant and alcohol treatment took about 65 hrs. to inject 1.0 PV of brine, while the rate after the polymer treatment took about 190 hrs. to inject the same volume.

The higher pressures encountered during the injection of the gelled polymer system are indicative of the limited extent of the depth of penetration of this treatment method. Near-well bore application is often the extent to which the gelled-polymer systems can be applied in the field. On the other hand, the surfactant and alcohol treatment method offers several major operational advantages. A low pH preflush step and zone isolation of the different permeability layers would not be required prior to the chemical treatment. The chemical slug can be easily injected and can achieve in-depth initial penetration without excessive injection pressures being encountered. The initial depth of penetration of the slug has been found to be easily controlled depending on the composition of the blend. Further, once in place the permeability barrier can be propagated deeper into the reservoir.

We claim:

1. A method of reducing the permeability of the more permeable zone of an underground formation having nonuniform permeability, said method comprised of injecting into the formation a blend comprised of an amine oxide and an alcohol, said blend introduced in an amount effective to reduce the permeability of the more permeable zone of the formation.

2. The method of claim 1 wherein the amine oxide is selected from the group consisting of dimethyltallow amine oxide, dimethyl(hydrogenated tallow)amine oxide, dimethylhexadecylamine oxide, dimethylcocoamine oxide, dimethyltallowamine oxide, dimethyl(middle cut)cocoamine oxide, dihydroxyethylcocoamine oxide and dihydroxyethyltallowamine oxide.

3. The method of claim 2 wherein said amine oxide is dimethyltallow amine oxide.

4. The method of claim 1 wherein said alcohol is selected from the group consisting of methanol, ethanol, n-propanol, isopropanol, isoamyl alcohol, n-butanol, sec. butanol, and tert. butanol.

5. The method of claim 4 wherein said alcohol is isopropanol.

6. The method of claim 1 further comprising the subsequent step of injecting into said formation an alcohol slug.

7. The method of claim 6 wherein the alcohol slug is comprised of an alcohol selected from the group consisting of methanol, ethanol, n-propanol, isopropanol, isoamyl alcohol, n-butanol, sec. butanol and tert. butanol.

8. A method of propagating a permeability barrier in an underground formation, said method comprising forming a permeability barrier in said formation and subsequently injecting an alcohol slug into said formation behind said permeability barrier to propagate said permeability barrier into said formation, wherein said permeability barrier is produced by injecting into said formation a slug comprising a blend of amine oxide and alcohol.

9. The method of claim 8 wherein the alcohol slug is selected from the group consisting of methanol, ethanol, n-propanol, isopropanol, isoamyl alcohol, n-butanol, sec. butanol and tert. butanol.

* * * * *